Aug. 29, 1967 A. ACCARY ETAL 3,338,988
METHOD OF MAKING BARS OF AN URANIUM COMPOUND
AND IN PARTICULAR URANIUM CARBIDE
Filed March 30, 1964 3 Sheets-Sheet 1
Fig.1.
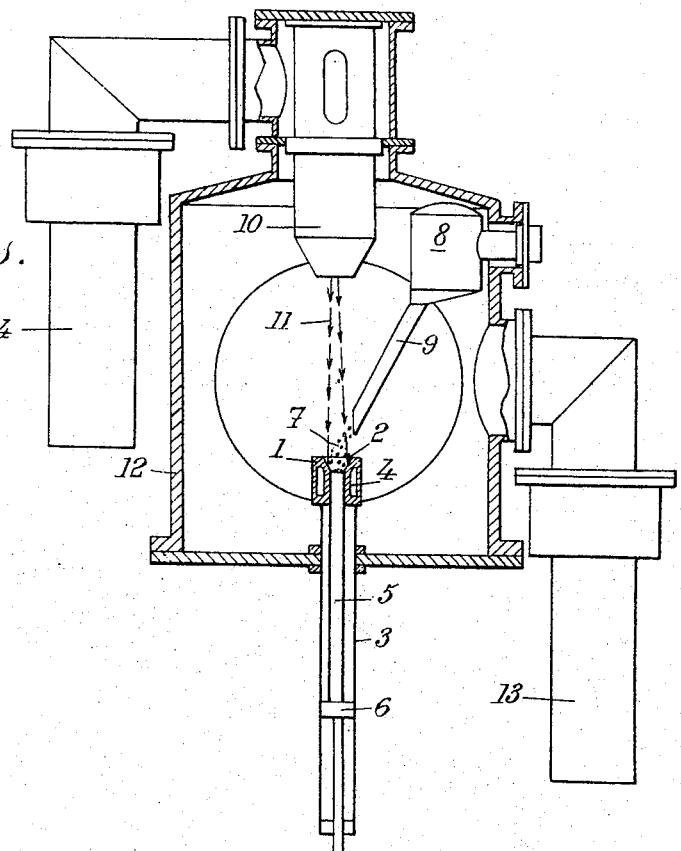
Fig.1bis.
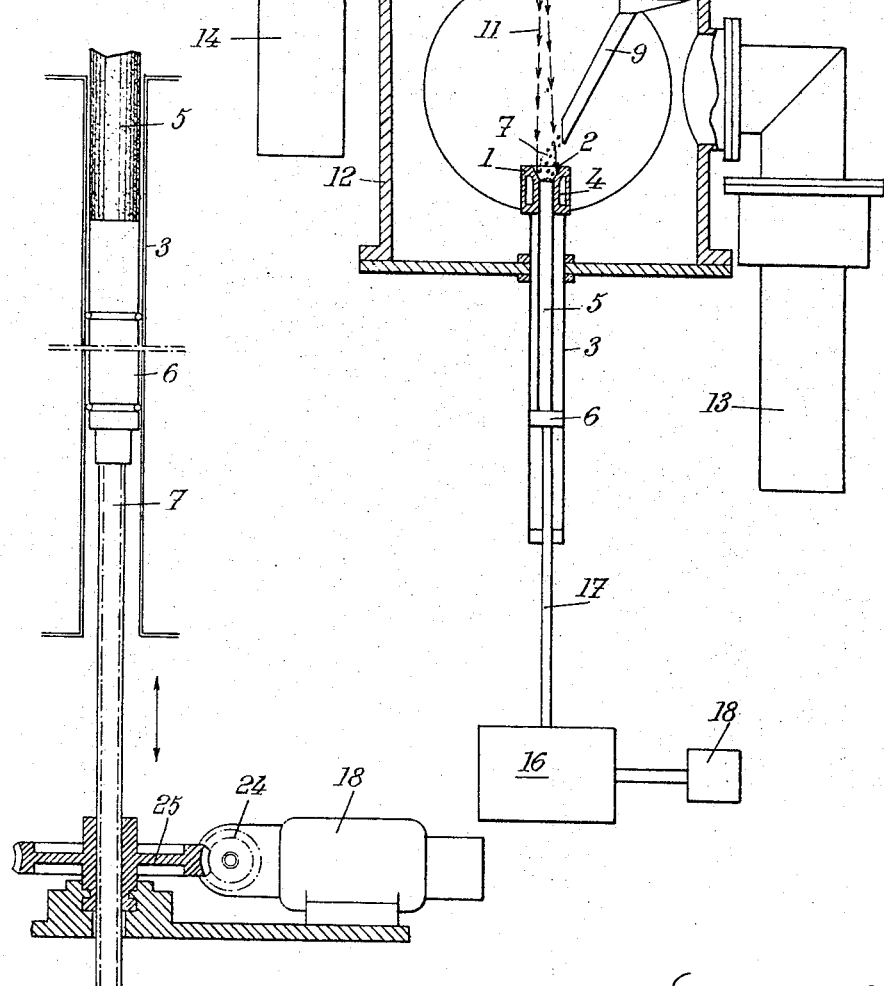
BY William D. Stokes
ATTORNEY

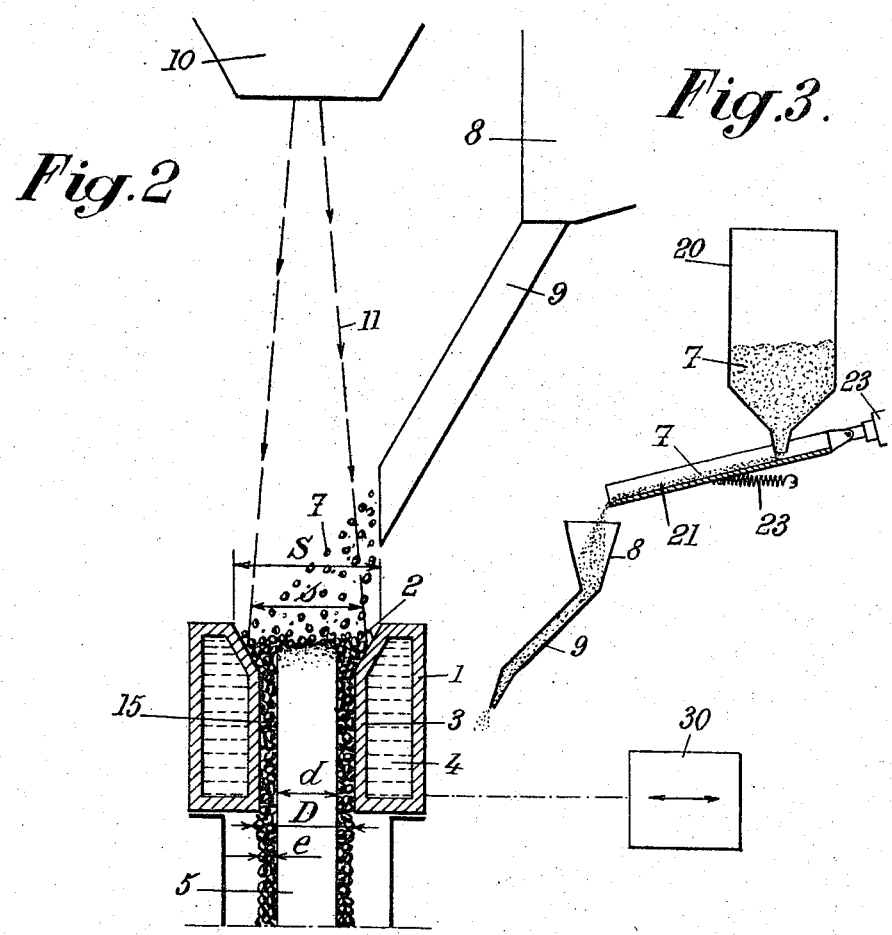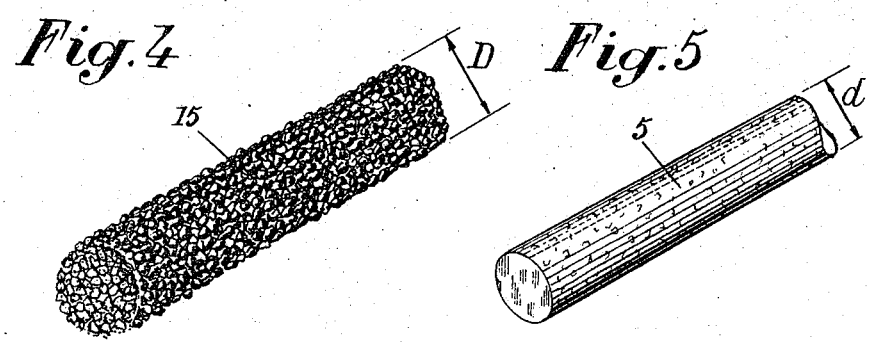

Fig. 7.
Fig. 8.
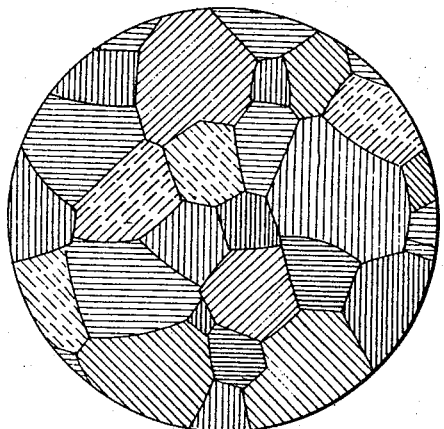
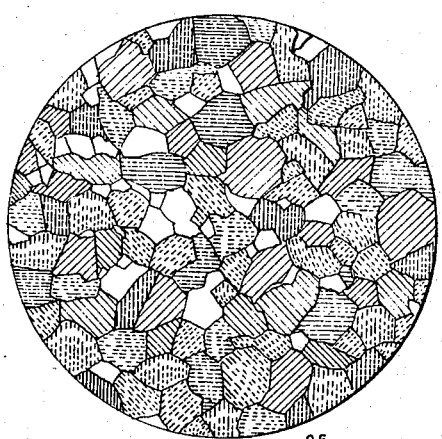
Fig. 6.

United States Patent Office
3,338,988
Patented Aug. 29, 1967

3,338,988
METHOD OF MAKING BARS OF AN URANIUM COMPOUND AND IN PARTICULAR URANIUM CARBIDE
André Accary, Paris, and Jean Trouve, Versailles, France, assignors to Commissariat à l'Energie Atomique, Paris, France, a corporation of France
Filed Mar. 30, 1964, Ser. No. 355,751
Claims priority, application France, Apr. 4, 1963, 930,455
9 Claims. (Cl. 264—.5)

The present invention relates to methods of casting bars of an uranium compound, and in particular uranium carbide bars.

The chief object of the present invention is to permit of obtaining bars of an improved quality, and in particular free from cracks, by eliminating excessive thermal stresses during the cooling of said bars.

The invention consists in starting from grains which are molten in a suitable mould and in performing this melting in such manner as to leave, along the wall of the mould, a layer of grains which are not molten and form a protecting cushion during the cooling operation, after which said layer is removed. In particular, melting is obtained by a concentrated electron bombardment which is localized so that the external layer is not molten.

According to another feature of the present invention, in a method for the continuous casting of bars, that is to say in a method where the bars are extracted in a continuous fashion from the mould as melting is going on, the mould is subjected to a vibratory effect which makes more uniform the distribution of the grains and facilitates heat insulation and melting.

Preferred embodiments of the present invention will be hereinafter described with reference to the appended drawings, given merely by way of example, and in which:

FIG. 1 is a diagrammatic vertical sectional view of an apparatus for carrying out the method according to the present invention;

FIG. 1a diagrammatically shows in elevational view a device for removing the bar as it leaves the mould;

FIG. 2 separately shows, on an enlarged scale and in axial section, the mould proper;

FIG. 3 separately shows the apparatus for distributing the grains to be used in the mould;

FIGS. 4 and 5 are perspective views showing an uranium carbide bar, respectively such as it is obtained when directly leaving the mould and after removal of the external layer;

FIG. 6 shows on an enlarged scale in axial section a bar according to a first type of structure;

FIGS. 7 and 8 shows on a still enlarged scale a cross section of a bar obtained according to the present invention, for two different rates of extraction, respectively.

The invention is concerned with the obtainment of bars of refractory nuclear fuels, and in particular of uranium and carbon alloys, such as uranium monocarbide.

It should first be reminded that it is already known to melt an uranium alloy through various means and in particular by means of an electric arc.

Most of these known methods involve several drawbacks the most important of which is that, during the cooling down operation, very important thermal gradients occur which impose stresses on the solid products. As a result, if the product is not of large volume, such as it is the case for small bars, said product is brittle. If the pieces to be obtained are of big size, breaking thereof is to be feared.

On the other hand, most of the known methods are discontinuous. In addition to their high cost, it must be noted against them that solidification generally involves segregation, that is to say a difference of composition from one point to another of the piece that is obtained. The pieces are therefore heterogeneous.

According to the present invention, in order to obviate this drawback the melting operation is exerted on a material in the form of grains so as to interpose, between the wall of the mould and the body of the bar to be obtained, a layer of grains which are not molten and therefore constitute a protective cushion.

This cushion serves to absorb the difference of temperature between the cooled mould and the molten bath, thus eliminating tensions that might occur during cooling. On the other hand, it cooperates in preventing adhesion between the molten metal and the wall of the mould, which facilitates the obtainment of a continuous operation during which the bar is constantly extracted as it is molten and solidified. Furthermore the method according to this invention avoids segregation.

For carrying out the method according to the present invention, it is therefore important, when the mould is fed with grains, to make use of a heating which accumulates the calories in the heart of the mould whereas it is insufficient or partly sufficient for melting the grains in the peripheral portions.

Such a result may be obtained in different manners.

For instance if it were desired to obtain tubular bars, the heat source might be given an annular shape in cross section, care being taken to comply with the above mentioned condition, that is to say to obtain an incomplete melting in the peripheral and central portions. For this purpose the heating source, supposed to be substantially punctual, might be displaced at the inlet of the mould in such manner as to cause it to describe a circle (or, inversely, the mould would be displaced with respect to the source). As a rule, by suitably choosing the shape of this source and by displacing it suitably, it will be possible to obtain a solid or hollow bar of any desired cross section (circular, cross-shaped, including fins, and so on).

It seems advantageous, as it will be hereinafter supposed, to make use, to ensure the thermal action, of an electronic source, that is to say of an electron bombardment gun, the axis of which may be either fixed or movable (in particular in the above considered case of tubular bars).

It will be supposed, with reference to FIGS. 1 and 2, that it is desired to melt uranium monocarbide at the upper part of a mould 1 comprising a top conical portion 2 and a cylindrical body 3, this mould being cooled by circulation of a liquid 4. Such an arrangement permits of obtaining, at the open lower end of the mould, a bar 5 which is extracted in a continuous manner by means of a movable head 6 which initially constitutes the bottom of the mould.

According to a preferred embodiment of the invention there is provided, in combination with such a mould:

On the one hand, means for feeding said mould with grains 7 of uranium carbide, such means comprising a vessel 8 with an outlet conduit 9, and On the other hand, an electron gun 10 the beam 11 of which is directed along the vertical axis of the mould and the adjustment of which is such that, in the plane where said beam strikes the molten bath, the cross section $s$ of said beam is smaller than the cross section S at the top of the mould.

The whole is arranged in a container 12 wherein is provided a suitable rarefied atmosphere of argon corresponding for instance to a vacuum of about 10 mm. of mercury. This vacuum is obtained by means of a pumping device 13 which, in the embodiment illustrated by FIG. 1, is different from the vacuum forming device 14 of the gun.

Of course the various parameters of the system are adjusted so as to obtain the desired conditions of operation, and in particular to keep at a suitable value the thickness $e$ of grains 15 (FIG. 2) which are not molten and surround bar 5. These parameters are, in particular, cross-section $s$, the size of the grains, the thermal power of the gun and the rate at which the grains are fed, which rate corresponds to the rate of extraction V of the bar.

By way of example, for a mould the inner diameter of which is 30 mm. it is advantageous to arrange so as the bar to be extracted comprises a layer 15 of unmolten grains having a thickness $e$ ranging from 2 to 4 mm.

It will be understood that, starting for instance from such a condition, it will be possible for anyone skilled in the art to choose the value of the above mentioned parameters, after successive experimentations to obtain the desired purpose.

Concerning cross section $s$, it may be varied at will, either by means of any device for adjusting the concentration of beam 11 or by varying the position of the mould 1 with respect to the beam 11.

Concerning the size of the grains, it should be noted that if this size is too big the thickness of the molten bar is not sufficient for wholly absorbing the grains which, due to the fact that they are not wholly molten, are merely welded together on the bars. On the other hand if this size is too small the grains are driven, during melting, by the gaseous stream due to the reaction of residual oxygen with the material that is supplied and the carbon thereof. The size of the particles preferably ranges from one to four millimeters.

In the case of a mould having an inner diameter D of 30 mm., the size of the grains should preferably range from two to four millimeters.

It should be noted, concerning the composition of the grains, that it is possible, for instance in the case of uranium monocarbide, to use as raw material uranium carbide such as obtained directly by reduction of uranium dioxide at 1700° C. by means of carbon, which reduction, if the composition of the reaction mixture is suitably adjusted, leads to the obtainment of a sponge-like alloy of uranium and carbon of a composition corresponding substantially to UC.

But if it were desired to act upon the final composition of the bar to be obtained it would also be possible to feed the mould with grains of different compositions. Practice shows that the product that is obtained is homogeneous provided that the amount of carbon does not vary by more than 0.5% by weight.

Concerning the power of the electron bombardment it must be adjusted in such a manner as just to obtain melting. As a matter of fact, if this power is too great, due to surface overheating of the bath intensive volatilization and also the projection of molten droplets on the walls of the mould would cause the formation of an adhesive layer of carbide thereon. If this layer becomes welded with the bar that is being formed, it stops the normal downward movement of said bar, which may be broken as a consequence. As a rule the energy that is brought into play should average four kilowatts.

Concerning the feed rate of the grains, which is to be chosen in accordance with the rate of extraction V, it is adjusted through any suitable means. For instance distributor 8 may be made as illustrated by FIG. 3.

This distributor comprises a hopper 20 at the bottom of which the grains flow out onto a vibrating plate 21. This plate is connected with resilient means 22 and controlled by an electro-magnet 23. The grains from plate 21 pass into a hopper 8 the bottom of which feeds conduit 9.

Movable plate 21 being thus actuated by electromagnet 23 fed with alternating current, the rate of distribution may be varied for instance by acting upon the voltage applied by the terminals of the electromagnet. The amplitude of the displacements of plate 21 ranges from 0.1 to 0.5 mm. under conditions where resonance is obtained.

Finally concerning the rate of downward movement of bar 5, it may vary within limits relatively wide, for instance from 4 cms. per hour to 300 cms. per hour, according to the nature of the product to be obtained and as hereinafter indicated. Advantageously this rate ranges from 150 to 200 cms. per hour.

The device 16 (FIG. 1) for driving head 6 through a rod 17 may include a change speed device.

Said device 16 is for instance of the kind including a tangential screw or a rack driven, with speed reduction, from a motor 18.

FIG. 1a shows a construction wherein motor 18 drives an endless screw 24 in mesh through a toothed wheel 25 cooperating as a nut with extraction rod 7 a portion of which is for this purpose provided with screw threads. In this case, adjustment of the speed of extraction may be effected by acting upon the voltage across the terminals of motor 18.

It has been found that rate V has practically no influence upon the power necessary for melting the material. This means that the amount of heat necessary for melting the grains is practically negligible as compared with the amount of heat that is lost either by radiation of the bath or by conduction of the bar.

On the other hand within the whole range of speeds that is used, satisfactory results are obtained concerning the structure of the bar. The only difference between the highest and lower speeds of melting would be a tendency to a refining of the grains when high speeds are used.

The limit upper value of 300 cms. per hour corresponds only to characteristics of the apparatus that is utilized and not to a physical parameter of the melting operation. Therefore substantially higher speeds may preferably be used.

In what precedes, the example given concerns bars of 30 mm. diameter, in which case it is possible to obtain bars 30 cms. long for usual applications.

But these indications have no limitative character.

Device 16 may be made to obtain, as a function of its stroke, bars of any desired length. Likewise, the diameter might be smaller, or even greater. There would be no obstacle to making bars of a diameter of 100–200 mm. In this case, limit of the diameter would be imposed by the power of existing electron guns and maybe by the external stresses developed in the bar during melting, although layer 15 is always capable of improving the conditions concerning this point.

Anyway the invention permits of obtaining in a continuous manner bars without cracks and having excellent qualities, in particular of homogeneity, as it results from a macrographic and micrographic tests and from analysis.

FIGS. 4 and 5 respectively show a bar such as it leaves the mould, that is to say with a layer 15 of grains on its surface and the same bar after a machining or other treatment for removing this layer.

FIG. 6 shows the macrography of the diametral section of a bar in the case of extraction rates V of relatively small value, for instance 20 cms. per hour. The crystals are relatively big, of an order ranging from 0.5 to 3 mm. and the macrography shows the basaltic crystallization which characterizes continuous melting. As a matter of fact, in this case, the non-molten carbide grains which surround the molten portion act as germs for starting crystallization thereof. The crystals have a tendency, initially, to grow perpendicularly to the axis of the bar. Then, when they develop, their direction of growth gradually becomes parallel to the axis of the bar. Macrography of the cross section, not shown by the drawings, indicates grains of uniform section having outlines characteristic of a good homogeneity on the conditions of crystallization.

In FIG. 7 and in relation with the macrography of FIG. 6, there is shown a micrography with a magnification of 25. It shows the absence of free uranium because it is known that free uranium is preferentially localized at the grain joins when the uranium and carbon alloy solidifies.

If now rate V is increased, for instance to values ranging from 120 to 150 cms. per hour, tendency appears to a final crystallization of the equiaxis type with grains of the order of from 0.2 to 0.6 mm., as shown by the micrography of FIG. 8, in transverse section.

Finally, it is found by analysis that the percentage of carbon by weight averages 4.57%, which corresponds to a sub-stoichiometric composition (uranium monocarbide, corresponding exactly to Formula UC, must contain 4.80% of carbon by weight). This single phase structure may be maintained when the percentage of carbons decreases to about 4.46% by weight. It depends upon the conditions of cooling of the bar and may be destroyed by reheating at low temperature. However it is possible to control the composition with an approximation of ±0.1% by weight of carbon.

It is also to be noted that the percentage of impurities (H, O, N) is very low. In particular the percentages of nitrogen are much lower than with arc melting methods.

According to another feature of the invention the apparatus for ensuring the delivery of the bar is subjected to vibrations the frequency of which may vary for instance from 50 to 5000 periods.

Although in the above described method the presence of layer 15 made of unmolten grains contributes in preventing adhesion of the metal to the mould, the application of vibrations is adapted further to facilitate the movement of the bar and to avoid adhesion.

Such a vibrating device comprises, for instance, an electro-magnet, shown at 30 in FIG. 2, fed from a generator of square signals (50–5000 cycles with a power averaging 40 watts for instance). The amplitude of the vibrations will be varied by acting upon the voltage across the terminals (the amplitude increasing when the voltage is increased). Said vibrations are mechanically transmitted to the mould through suitable means as diagrammatically indicated by the dot-and-dash line of FIG. 2.

The preceding description has been supposed to relate to the manufacture of uranium carbide bars. But it should be understood that many other applications might be imagined, in particular the invention might be used for other brittle refractory materials such for instance as:

alumina,
uranium dicarbide, and
thorium dicarbide.

The limits of use, concerning the nature of the material to be molten, would be fixed only either by the excessive volatility of this material or by its too small resistance to thermal shocks.

The advantages of the method according to the present invention are as follows:

Possibility of avoiding excessive thermal stresses during cooling so that bars having improved mechanical properties are obtained;

Possibility of continuous melting, and this with relatively moderate powers;

Possibility of obtaining different types of crystals and of varying the size of the grains;

Possibility of obtaining solid or hollow bars of any cross section and form; and Possibility of obtaining, in particular in the case of uranium carbide, very pure products of a well determined compostion the amount of carbon being controlled with an approximation of 0.1%.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What we claim is:

1. A method of casting a material which comprises starting from this material in the granular form, causing said granular material to flow continuously through a mould open at both ends, so that said material travels from one end to the other, while subjecting the central portion of said mould to heating from a distance so as to melt the grain present in said central portion while leaving a superficial layer of unmolten grains about said central portion, thus forming a bar which travels through said mould, cooling the mould to cause said bar to solidify as it travels therethrough, and collecting the cooled bar.

2. A method of casting a material which comprises starting from this material in the granular form, causing said granular material to flow continuously through a mould while subjecting the central portion of said mould to electron bombardment so as to melt the grain present therein while leaving a superficial layer of unmolten grains about said central portion, thus forming a bar which travels through said mould, cooling the mould to cause said bar to solidify as it travels therethrough, and collecting the cooled bar.

3. A method according to claim 1 wherein, said mould being of tubular shape, the electron bombardment beam is directed along the axis of said mould, while limiting the cross section of said beam so that it does not reach the marginal portion of the inside of said mould.

4. A method according to claim 1 wherein said mould and said electron gun are moved relatively to each other with a translatory movement about an axis parallel to the direction of said electron gun.

5. A method according to claim 3 wherein, the diameter of said mould being 30 millimeters, the cross section of said beam where it strikes said grain is a circle having a diameter ranging from 26 to 28 millimeters.

6. A method according to claim 1 wherein the size of said grains ranges from 1 to 4 millimeters.

7. A method according to claim 2 wherein the grains fed to said mould are subjected to a vibratory action.

8. A method according to claim 1 wherein said granular material consists of grain of different composition.

9. A method according to claim 2 which further comprises machining the bar collected from said mould to remove therefrom the external layer of unmolten grains.

References Cited

UNITED STATES PATENTS

| | | | |
|---|---|---|---|
| 2,793,282 | 5/1957 | Steigerwald | 18—2.2 |
| 2,902,714 | 9/1959 | Johnson | 264—111 X |
| 2,922,213 | 1/1960 | Bollack et al. | 75—200 X |
| 2,922,710 | 1/1960 | Dombrowski et al. | 75—84 |
| 3,183,086 | 5/1965 | Kurtz et al. | 75—222 |

L. DEWAYNE RUTLEDGE, *Primary Examiner.*